United States Patent [19]
Lee et al.

[11] Patent Number: 5,159,382
[45] Date of Patent: Oct. 27, 1992

[54] DEVICE AND METHOD FOR ELECTROMAGNETICALLY ACTIVATING THE SHUTTER OF A CAMERA

[75] Inventors: J. Kelly Lee, Rochester; David R. Dowe, Holly; Tom M. Seamans, Corfu, all of N.Y.

[73] Assignee: Eastman Kodak Company, Rochester, N.Y.

[21] Appl. No.: 735,510

[22] Filed: Jul. 25, 1991

[51] Int. Cl.⁵ ............................................. G03B 7/097
[52] U.S. Cl. .................. 354/435; 354/234.1; 354/271.1
[58] Field of Search ............... 354/435, 440, 234.1, 354/271.1

[56] References Cited

U.S. PATENT DOCUMENTS

| | | | |
|---|---|---|---|
| 3,517,599 | 6/1970 | Sapp, Jr. et al. | 95/64 |
| 4,332,450 | 6/1982 | Griffith | 354/234.1 |
| 4,344,687 | 8/1982 | Cloutier | 354/246 |
| 4,361,387 | 11/1982 | Cloutier | 354/43 |
| 4,466,725 | 8/1984 | Hirohata | 354/403 |
| 4,564,278 | 1/1986 | Ohmura | 354/195.12 |

FOREIGN PATENT DOCUMENTS 63-36228  2/1988  Japan .

Primary Examiner—Michael L. Gellner
Attorney, Agent, or Firm—Ronald M. Reichman

[57] ABSTRACT

A device and method for electromagnetically activating the shutter of a camera to provide different aperture openings comprises:
an armature having a core and a coil, the core is capable of receiving current, and the armature will produce a first magnetic field;
a movable magnet member that produces a second magnetic field at one of its two ends, the second magnetic field is coupled to the first magnetic field and the other end of the member is coupled to one or more shutters; and
a circuit capable of receiving current coupled to a coil for setting the direction of current flow in the coil to a first direction or a second direction or for denying the presence of current flow in the coil so that when the coil receives no current a first magnetic field will not be present and the member will be at a first location and move one or more shutter elements to block the aperture and allow no light to enter the camera, and when current flows through the coil in a first direction the member will be attracted by the first magnetic field and move to a second location and move one or more shutter elements to form a first aperture size and if current flows through the coil in a second direction the member will be attracted by the first magnetic field and move one or more shutter elements to form a second aperture size.

19 Claims, 5 Drawing Sheets

DEVICE AND METHOD FOR ELECTROMAGNETICALLY ACTIVATING THE SHUTTER OF A CAMERA

RELATED APPLICATIONS

Reference is made to commonly assigned copending patent applications: U.S. Ser. No. 735,982, entitled "MULTI-APERTURE MAGNETIC SHUTTER" filed herewith in the names of John H. Alligood, John H. Minnick and David A. Castor; U.S. Ser. No. 735,980, entitled "SELF CENTERING BI-DIRECTIONAL ELECTROMAGNETIC ACTUATOR" filed herewith in the names of David A. Castor, Tom M. Seamans, J. Kelly Lee and David R. Dowe; and U.S. Ser. No. 735,489, entitled "A MAGNET AND SHUTTER ASSEMBLY FOR AN ELECTROMAGNETIC SHUTTER" filed herewith in the names of Jude A. Sangregory and Robert L. Kuhn, Jr.

BACKGROUND OF THE INVENTION

1. Field of the Invention

The invention relates generally to the field of photography, and particularly to an electromagnetically driven actuator that moves one or more camera shutter blades.

2. Description of the Prior Art

Leaf type or blade type mechanical shutters have been used to regulate the amount of light that is going to reach the imaging areas of a filmstrip contained within a camera. Typically, the leaf type of shutter is an array of metal "blades" that are pivoted so that they all swing towards or away from the lens aperture of the camera. When the shutter is closed, all the blades are overlapping in the center of the lens aperture and no light reaches the filmstrip. When the shutter is open, the blades pivot away from the center of the aperture, so that light may pass through the aperture and expose the filmstrip. Sometimes an array of metal blades are not used, and the leaf type mechanical shutters may have one or more blades, each of which may have a different diameter opening. When a picture is taken the blade or blades swing away from the center of the lens aperture so that light may pass through the aperture, through the blade or blade openings to expose the filmstrip. If a picture is not being taken, the shutter will be closed. Hence, one blade may block the opening of the other blade, or both blades openings may not be in optical alignment with the aperture. The power to open and close the leaf type mechanical shutters is provided by a spring or springs that are under tension, and the timing is controlled by a watch-type gear train.

Electromagnetic shutters have been developed to reduce the amount of energy or power that is required to open and close leaf type mechanical shutters. Electromagnetic shutters are faster than mechanical shutters from 4 mm diameter to 20 mm diameter aperture openings and electromagnetic shutters may be controlled with greater accuracy than mechanical shutters. The manufacturing cost of an electromagnetic shutter is less than the manufacturing cost of mechanical shutters.

The prior art utilized solenoids with linkages that are coupled to the shutter blades to open and close electromagnetic powered shutters. Some of the disadvantages of prior art solenoids are: the solenoids used a large amount of current, i.e. approximately 2 amps; the solenoid had no intermediate positions, i.e., the solenoid and the lens aperture was either open or closed; and the solenoids were slow due to inertia required to move the large mass of the solenoids plunger.

SUMMARY OF THE INVENTION

The present invention overcomes the disadvantages of the prior art by providing a three position shutter actuation device and method, that is pivoted at the balance point of the actuator and only uses one coil. Thus, the presence of only one coil means that less energy is required to move the actuator of this invention. Furthermore, the actuator of this invention is easy to position and hence better control of the three shutter orientations is attained.

The foregoing is achieved by providing:

an armature having a core and a coil, the core is capable of receiving current, and the armature will produce a first magnetic field;

a movable magnet member that produces a second magnetic field at one of its two ends, the second magnetic field is coupled to the first magnetic field and the other end of the member is coupled to one or more shutters; and a circuit capable of receiving current coupled to a coil for setting the direction of current flow in the coil to a first direction or a second direction or for denying the presence of current flow in the coil so that when the coil receives no current a first magnetic field will not be present and the member will be at a first location and move one or more shutter elements to block the aperture and allow no light to enter the camera, and if current flows through the coil in a first direction the member will be attracted by the first magnetic field and move to a second location and move one or more shutter elements to form a first aperture size and if current flows through the coil in a second direction the member will be attracted by the first magnetic field and move to a third location and move one or more shutter elements to form a second aperture size.

DESCRIPTION OF A PREFERRED EMBODIMENT

Figure 1:
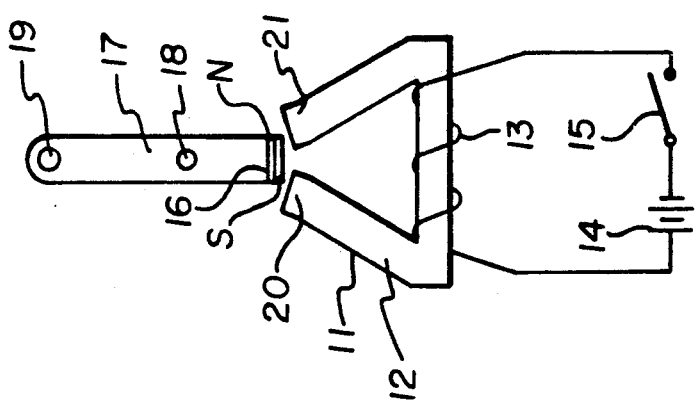
FIG. 1 is a diagram that illustrates the operation of this invention by showing an actuator in a first position.

Referring now to the drawings in detail, and more particularly to FIG. 1, the reference character 11 represents an armature that includes a core 12 and coil 13. The positive terminal of battery 14 is connected to one of the ends of coil 13 and the negative terminal of battery 14 is connected to one of the two terminals of switch 15. The second terminal of switch 15 is connected to the other end of coil 13.

Actuator 17 has a pivot point 18 and a pin 19 that is used to connect actuator 17 to the shutter blades, hereinafter described. Actuator 17 may be made of any non-magnetic material, i.e. plastic.

Permanent magnet 16, which has a North pole (that is indicated on the drawings by the letter N) and a South pole (that is indicated on the drawings by the letter S) is connected to one of the ends of actuator 17, by any known means. For instance, magnet 16 may be: press fit into a cavity of actuator 17; riveted to actuator 17, bolted to actuator 17, glued to actuator 17, etc. Magnet 16 of actuator 17 is placed in close proximity with poles 20 and 21 of armature 11. When switch 15 is open, no current will be supplied to coil 13 and actuator 17 will be positioned in the first position as shown in FIG. 1.

Figure 2:
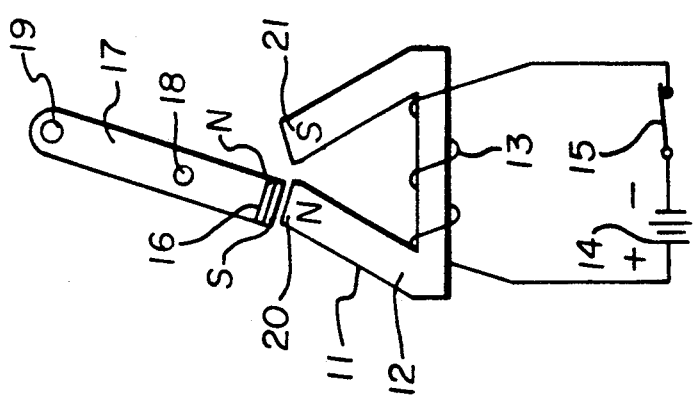
FIG. 2 is a diagram that illustrates the operation of this invention by showing an actuator in a second position.

FIG. 2 illustrates the position of actuator 17 when switch 15 is closed. The closing of switch 15 causes a current from battery 14 to appear in coil 13 and coil 13 to induce a magnetic field. The magnetic field causes pole 20 of core 12 to act as a North pole and pole 21 of core 12 to act as a South Pole. Pole 20 will attract the South pole of magnet 16 and cause actuator 17 to move to the second position which is shown in FIG. 2.

Figure 3:
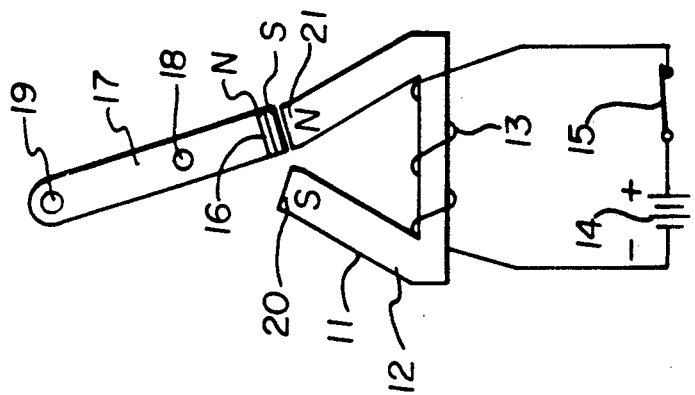
FIG. 3 is a diagram that illustrates the operation of this invention by showing an actuator in a third position.

FIG. 3 depicts the device shown in FIG. 1 and FIG. 2 with the polarity of battery 14 reversed. The closing of switch 15 causes a current from battery 14 to appear in coil 13 and coil 13 to induce a magnetic field. The magnetic field causes pole 20 of core 12 to act as a South pole and pole 21 of core 12 to act as a North pole. Pole 21 will attract the South pole of magnet 16 and cause actuator 17 to move to the third position which is shown in FIG. 3.

Figure 4:
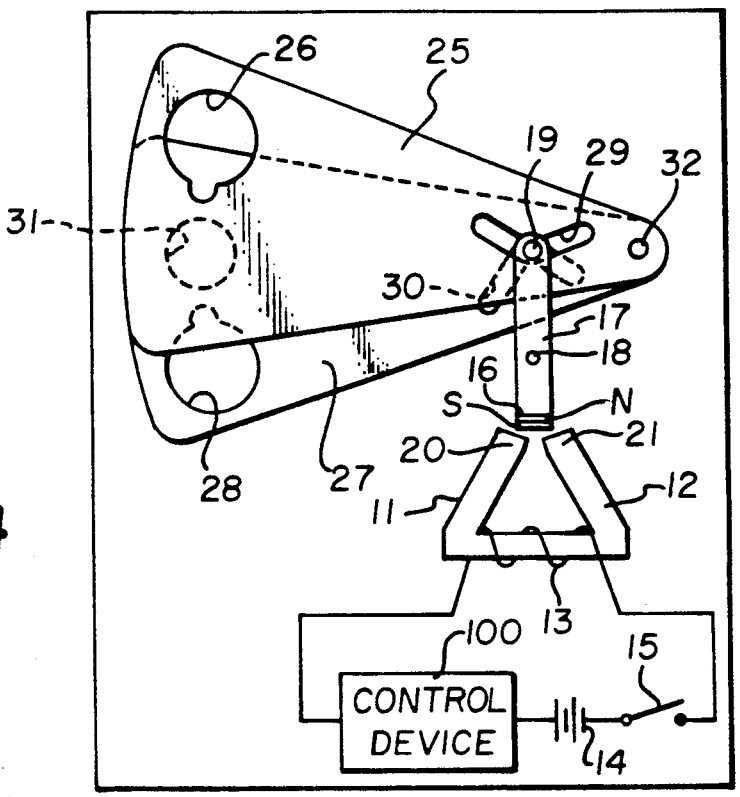
FIG. 4 is a diagram that illustrates an actuator in the first position and two shutter blades blocking the aperture.

FIG. 4 shows actuator 17 and magnet 16 having the position shown in FIG. 1 (first position) with coil 13 wrapped around core 12 (which has pole pieces 20 and 21). Switch 15 is connected to one of the ends of coil 13 and one of the terminals of battery 14. The second terminal of battery 14 is connected to polarity controlling device 100. Device 100 is also connected to one of the ends of coil 13. Device 100 controls the direction of current flow in coil 13. The manner in which the coil current is controlled will be more fully set forth in the description of FIG. 7.

Shutter blade 25 has an aperture orifice 26 and shutter blade 27 has an aperture orifice 28. Slots 29 and 30 are in blades 25 and 27. Blades 25 and 27 are shown in a closed position with blade 27 positioned under blade 25. In this position blades 25 and 27 completely cover aperture 31 and do not permit any light to enter the optical path of the camera (not shown). Actuation pin 19 of actuator 17 is placed in slots 29 and 30 of blades 25 and 27. Pivot point 32 of blades 25 and 27 and pivot point 18 of actuator 17 are connected to the camera (not shown). Thus, actuator 17 will pivot about point 18 and blades 25 and 27 will pivot about point 32. In this instance shutter switch 15 is open, and no current will be supplied to coil 13. Actuator 17 will be in the first position and shutter blades 25 and 27 will completely cover aperture 31.

Figure 5:
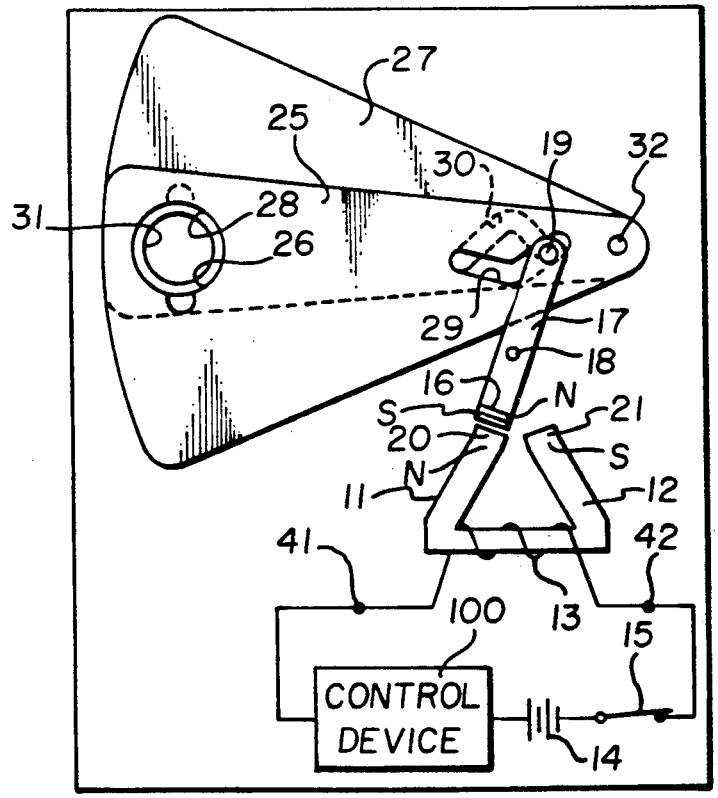
FIG. 5 is a diagram that illustrates an actuator in the second position and two shutter blades forming a large aperture opening.

FIG. 5 shows the components illustrated in FIG. 4 with shutter switch 15 closed. The description of FIG. 7 will describe how device 100 causes current to flow from battery 14 to point 41 through coil 13 to point 42 and back to battery 14 or how device 100 causes current to flow from battery 14 to point 42 through coil 13 to point 41 and back to battery 14. Coil 13 will induce a magnetic field. The magnetic field causes pole 20 of core 12 to act as a North pole and pole 21 of core 12 to act as a South pole. Pole 20 will attract the South pole of magnet 16 and cause actuator 17 to pivot about point 18 and move to the position shown in FIG. 5 (second position). The pivoting of actuator 17 causes pin 19 to move in slots 29 and 30 of blades 25 and 27. The movement of pin 19 in slots 29 and 30 will cause blades 25 and 27 to pivot about point 32 and move to the orientation shown in FIG. 5. Blade 27 will be under blade 25 and blades 25 and 27 will be in their maximum open position. Aperture orifices 26 and 28 will form a large aperture opening to allow the maximum amount of light to enter the camera (not shown).

Figure 6:
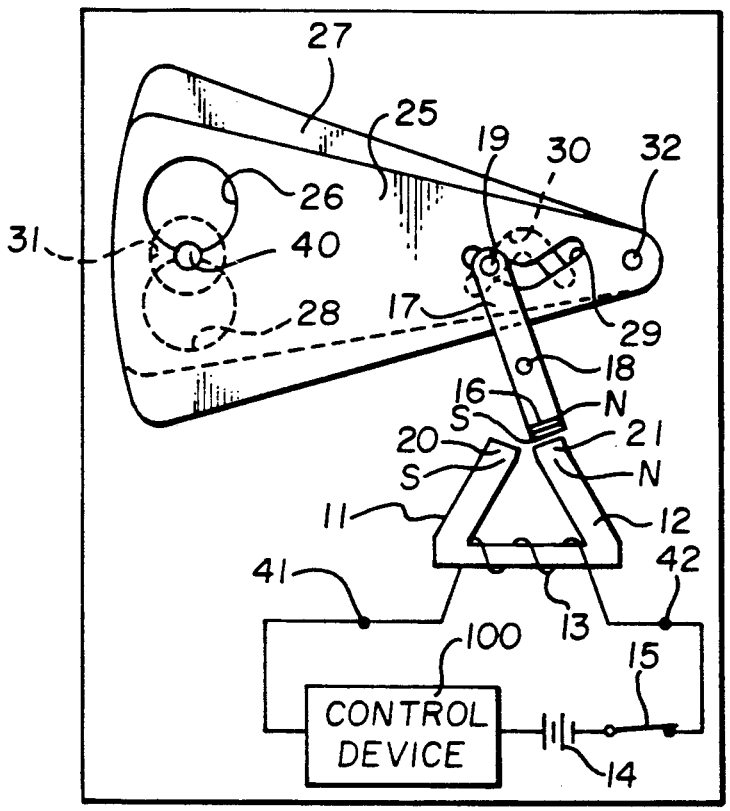
FIG. 6 is a diagram that illustrates an actuator in the third position and two shutter blades forming a small aperture opening.

FIG. 6 shows the components illustrated in FIG. 4 with shutter switch 15 closed and pole pieces 20 and 21 having the opposite polarity that they had in FIG. 5. The description of FIG. 7 will describe how device 100 causes current to flow from battery 14 to point 41 through coil 13 to point 42 and back to battery 14 or how device 100 causes current to flow from battery 14 to point 42 through coil 13 to point 41 and back to battery 14. Coil 13 will induce a magnetic field. The magnetic field causes pole 20 of core 12 to act as a South pole and pole 21 of core 12 to act as a North pole. Pole 21 will attract the South pole of magnet 16 and cause actuator 17 to pivot about point 18 and move to the position shown in FIG. 6 (third position). The pivoting of actuator 17 causes pin 19 to move in slots 29 and 30 of blades 25 and 27. The movement of pin 19 in slots 29 and 30 will cause blades 25 and 27 to pivot about point 32 and move to the orientation shown in FIG. 6. Blade 27 will be under blade 25 and blades 25 and 27 will be in their minimum open position. Aperture orifices 26 and 28 will form a small aperture opening 40 to allow a small amount of light to enter the camera (not shown).

Figure 7:
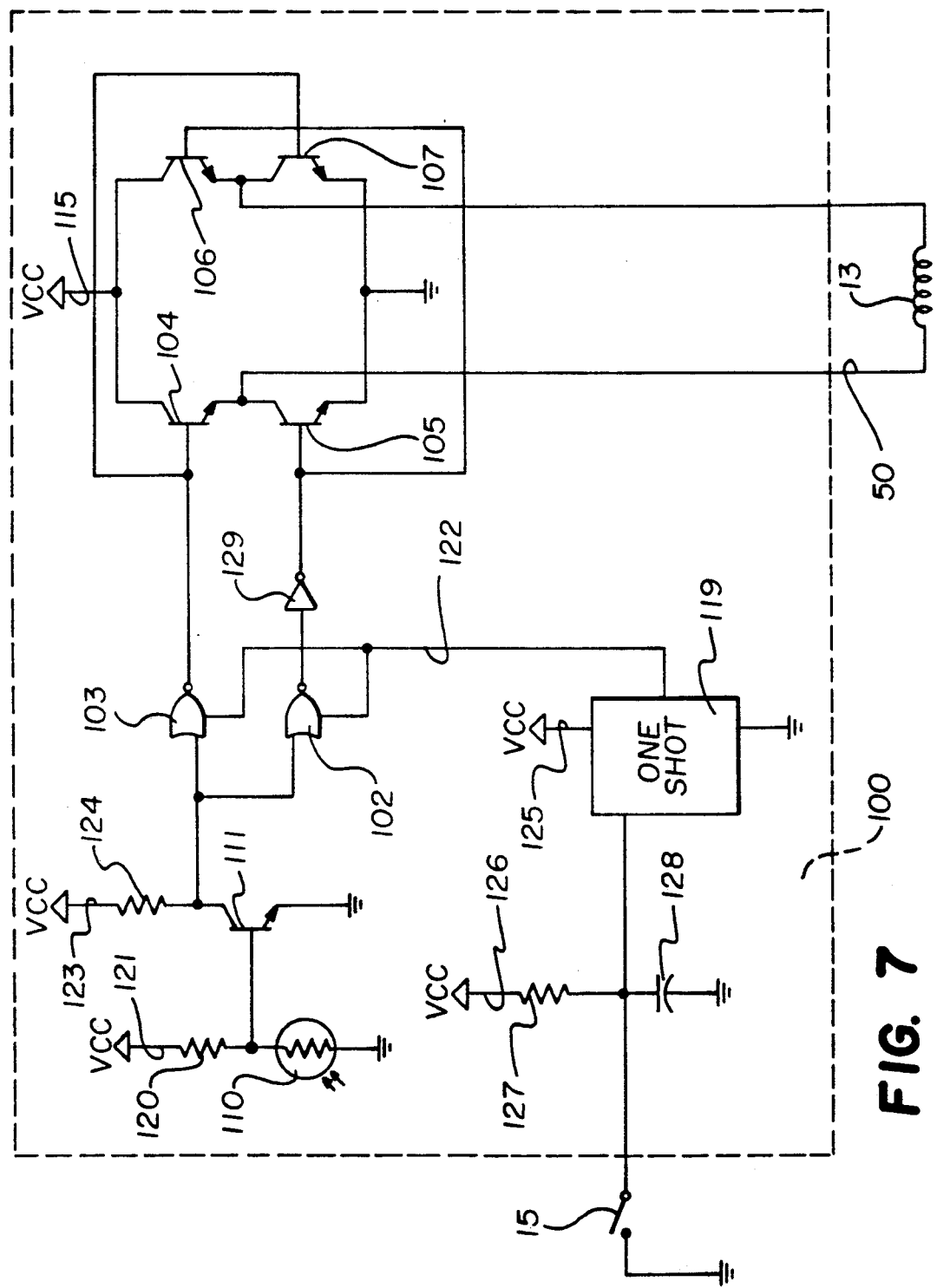
FIG. 7 is a logic diagram of the device for controlling the polarity of the coil shown in FIGS. 4–6.

FIG. 7 describes polarity controlling device 100 that was shown in FIGS. 4–6. Photocell 110 has two terminals. The first terminal is connected to ground, and the second terminal is connected to the base of NPN transistors 111 and one of the ends of resistor 120. The other end of resistor 120 is connected to the positive terminal of battery 14 via wire 121. The emitter of transistor 111 is connected to ground and the collector of transistor 111 is connected to the inputs of NOR gates 102 and 103. The strobe input to gates 102 and 103 is the output of one shot 119 and is transmitted on line 122. The collector of transistor 111 is also connected to one of the ends of resistor 124 and the other end of resistor 124 is connected to the positive terminal of battery 14 via wire 123. The output of gate 102 is coupled to the input of inverter 129 and the output of inverter 129 is coupled to the base of NPN transistor 105 and the base of NPN transistor 106. The output of gate 103 is connected to the base of NPN transistor 104 and the base of NPN transistor 107. The emitter of transistor 104 is tied to the collector of transistor 105 and the emitter of transistor 104 and the collector of transistor 105 are connected to one of the ends of coil 13. The collector of transistor 104 is connected to the collector of transistor 106 and the collectors of the aforementioned transistors are connected to the positive terminal of battery 14 via wire 115. The emitter of transistor 105 is connected to the emitter of transistor 107 and the emitter of the above transistors are connected to ground. One of the ends of coil 13 is connected to the collector of transistor 107 and the emitter of transistor 106.

One of the ends of resistor 127 is coupled to the positive terminal of battery 14 via wire 126, and the other end of resistor 127 is connected to one of the ends of capacitor 128. Resistor 127 is also connected to the input of one shot 119, and to switch 15. Switch 15 is connected to the negative terminal of battery 14. The other end of capacitor 128 is coupled to ground. One shot 119 is coupled to the positive terminal of battery 14 via wire 125 and one shot 119 is also connected to ground.

The pressing of shutter switch 15 will cause a negative ground potential to be placed on the input of one shot 119, which will cause one shot 119 to have a pulsed output which will strobe the inputs of NOR gates 102 and 103. NOR gates 102 and 103 are configured as inverters and will be referred to as inverters hereinafter. When inverters 102 and 103 are enabled by the pulse from one shot 119, their outputs will control transistors 104, 105, 106 and 107 in either a forward fashion or no fashion at all depending on the polarity of the pulse.

The outputs of inverters 102 and 103 are determined by photocell 110. If little or low light is present when someone takes a picture with a camera (not shown) the set trip point of photocell 110 would be at a high potential. This would cause the base of transistor 111 to be at a high potential. Thus, transistor 111 would be off, and a high potential would be on the inputs of inverters 102 and 103. With a high input on inverter 102 and 103 there would be a low output from inverters 102 and 103. The output of inverter 102 is inverted by inverter 129. Thus, inverter 129 has a high output which causes transistors 105 and 106 to be in an off state. The low output from inverter 103 goes to the bases of transistor 104 and 107 causing them to turn on. At this juncture current is transmitted from battery 14 via wire 115 through transistor 104 and through coil 13 through transistor 107 to ground. The foregoing described the low light condition illustrated in FIG. 5. In this instance pole piece 20 of FIG. 5 will act as a North pole. Hence, actuator 17 will pivot to the position shown in FIG. 5 (position 2) and shutter blades 25 and 27 will be in their maximum open position causing the maximum aperture opening.

When photocell 110 senses a high light condition, photocell 110 causes the base of transistor 111 (whether switch 15 is depressed or not) to turn on. This causes the inputs to inverters 102 and 103 to be low, and the outputs of inverters 102 and 103 to be high. The output from inverter 103 causes transistors 104 and 107 to be high. Thus transistors 104 and 107 are in an off state. The output of inverter 102 is high which causes the output of inverter 129 to be low. This causes transistors 105 and 106 to be turned on which allows current to be transmitted from battery 14 via wire 115 to go through transistor 106 through coil 13 through transistor 105 to ground. Thus, the current travelled in an opposite direction that was previously described. The foregoing is only allowed to happen during the output pulse of one shot 119 that turns on the strobe input of inverters 102 and 103. This only happens when switch 15 is depressed, i.e. when someone wants to take a picture.

In the case where current is transmitted through transistor 106 the light condition illustrated in FIG. 6 would be present. Pole piece 21 of FIG. 6 would act as a North pole. Hence, actuator 17 would pivot to the position shown in FIG. 6 (position 3) and shutter blades 25 and 27 will be in their minimum open position. Aperture orifices 26 and 28 will form a small aperture opening to allow a small amount of light to enter the camera (not shown).

If switch 15 was not depressed, i.e. if someone did not want to take a picture with the camera (not shown), one shot 119 would not have an output pulse which would strobe the inputs of inverters 102 and 103. Thus, no current would be supplied to coil 13 and the condition illustrated in FIG. 4 would be present. Hence, actuator 17 would pivot to the position shown in FIG. 4 (position 1) so that shutter blades 25 and 27 will completely cover aperture 31.

Figure 8:
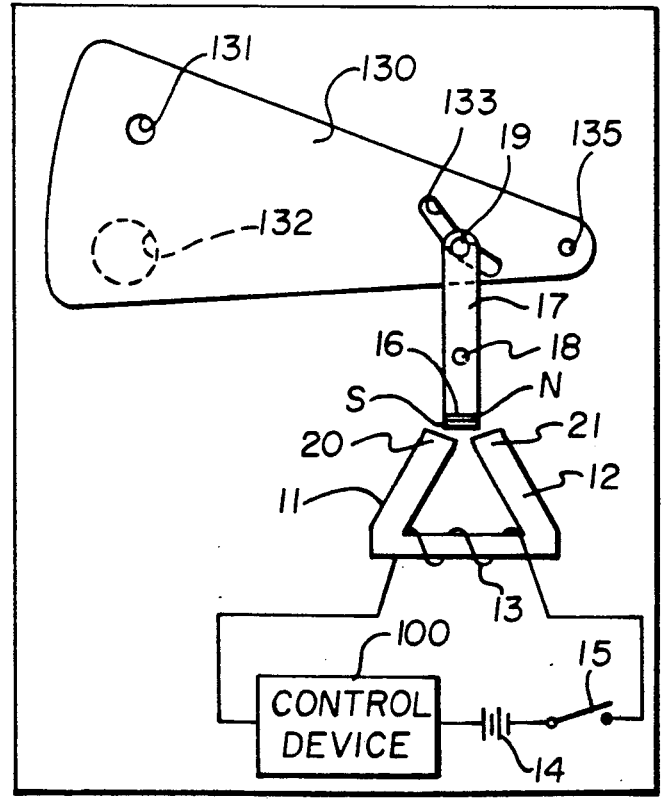
FIG. 8 is a diagram of an alternate embodiment of this invention that illustrates an actuator in the first position and one shutter blade blocking the aperture.
Figure 9:
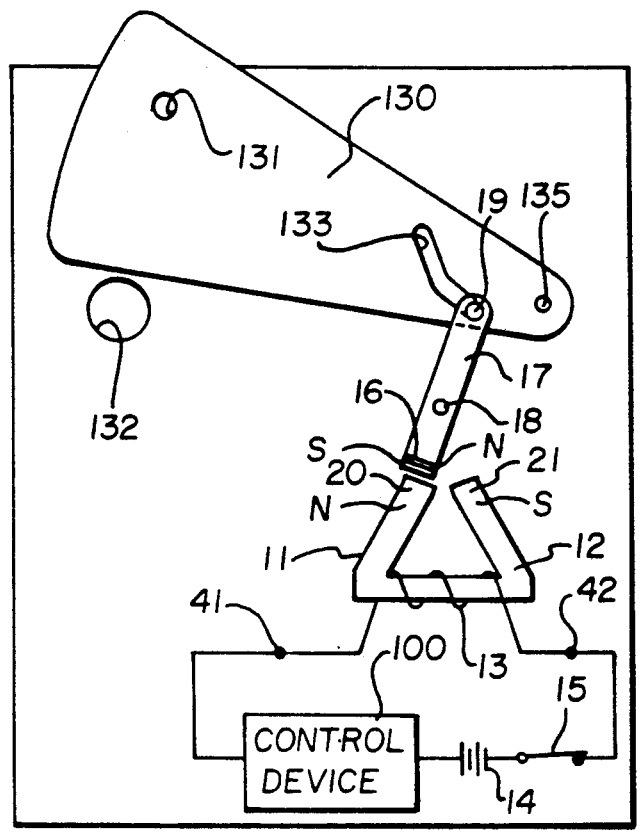
FIG. 9 is a diagram showing the actuator of FIG. 8 embodiment in the second position and one shutter blade forming a large aperture opening.
Figure 10:
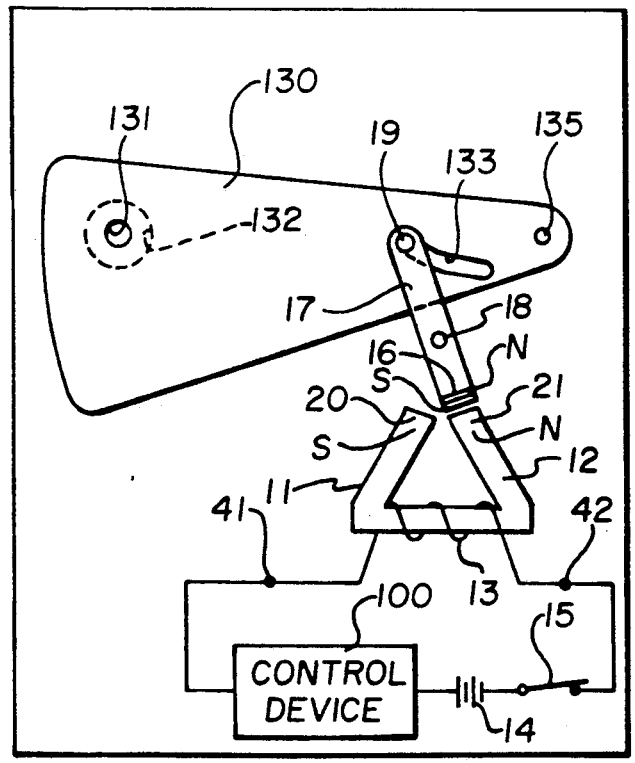
FIG. 10 is a diagram showing the actuator of FIG. 8 in the third position and one shutter blade forming a small aperture opening.

FIGS. 8-10 are an alternate embodiment of the invention shown in FIGS. 4-6. The invention shown in FIGS. 8-10 utilize one shutter blade 130 and the invention shown in FIGS. 4-6 utilize two shutter blades.

FIG. 8 shows actuator 17 and magnet 16 having the position shown in FIG. 1 with coil 13 wrapped around core 12. Core 12 has pole pieces 20 and 21. Switch 15 is connected to one of the ends of coil 13 and one of the terminals of battery 14. The second terminal of battery 14 is connected to polarity controlling device 100. Device 100 is also connected to one of the ends of coil 13. Device 100 controls the direction of current flow in coil 13. The manner in which the coil current is controlled was set forth in the description of FIG. 7.

Shutter blade 130 has an aperture orifice 131. Slot 133 appears in blade 130. Blade 130 is shown in a closed position (position 1) with blade 130 completely covering aperture 132 and not permitting any light to enter the optical path of the camera (not shown). Actuation pin 19 of actuator 17 is placed in slot 133 of blade 131. Pivot point 135 of blade 131 and pivot point 18 of actuator 17 are connected to the camera (not shown). Thus, actuator 17 will pivot about point 18 and blade 131 will pivot about point 135. In this instance shutter switch 15 is open, and no current will be supplied to coil 13. Actuator 17 will be in the first position and shutter blade 130 will completely cover aperture 132.

FIG. 9 shows the components illustrated in FIG. 8 with shutter switch 15 closed. The description of FIG. 7 described how device 110 caused current to flow from battery 14 to point 41 through coil 13 to point 42 and back to battery 14 or how device 100 causes current to flow from battery 14 to point 42 through coil 13 to point 41 and back to battery 14. Coil 13 will induce a magnetic field. The magnetic field causes pole 20 of core 12 to act as a North pole and pole 21 of core 12 to act as a South pole. Pole 20 will attract the South pole of magnet 16 and cause actuator 17 to pivot about point 18 and move to the position as shown in FIG. 9 (second position). The pivoting of actuator 17 causes pin 19 to move in slot 133 of blade 130. The movement of pin 19 in slot 133 will cause blade 130 to pivot about point 135 and move to the orientation shown in FIG. 9. Blade 130 will be in its maximum open position. Aperture orifice 131 and blade 130 will not cover aperture opening 132. Thus, the maximum amount of light is allowed to enter the camera (not shown).

FIG. 10 shows the components illustrated in FIG. 8 with shutter switch 15 closed and pole pieces 20 and 21 having the opposite polarity that they had in FIG. 9. The description of FIG. 7 described how device 100 caused current to flow from battery 14 to point 41 through coil 13 to point 42 and back to battery 14 or how device 100 causes current to flow from battery 14 to point 42 through coil 13 to point 41 and back to battery 14. Coil 13 will induce a magnetic field. The magnetic field causes pole 20 of core 12 to act as a South pole and pole 21 of core 12 to act as a North pole. Pole 21 will attract the South pole of magnet 16 and cause actuator 17 to pivot about point 18 and move to the position shown in FIG. 10 (third position). The pivoting of actuator 17 causes pin 19 to move in slot 133 of blade 130. The movement of pin 19 in slot 133 will cause blade 131 to pivot about point 135 and move to the orientation shown in FIG. 10. Blade 130 will be in its minimum open position. Aperture orifice 131 of blade 130 will cover a portion of aperture opening 132 to allow a small amount of light to enter the camera (not shown).

The above specification describes a new and improved device and method for electromagnetically activating the shutter of a camera. It is realized that the above description may indicate to those skilled in the art additional ways in which the principles of this invention may be used without departing from the spirit. It is, therefore, intended that this invention be limited only by the scope of the appended claims.

What is claimed is:

1. An electromagnetic actuator device for a camera that has one or more shutter elements for controlling the amount of light that enters a camera through a lens aperture, said device comprises:
    an armature comprising a core and a coil, said core is capable of receiving current and said armature will produce a first magnetic field;
    a movable magnet member having two ends, said member produces a second magnetic field at one of its two ends, said second magnetic field is coupled to said first magnetic field and the other end of said member is coupled to one or more shutters; and
    means coupleable with a source of current and said coil for setting the direction of current flow in said coil to a first direction or a second direction or for denying the presence of current flow in said coil so that when said coil receives no current a first magnetic field will not be present and said member will be at a first location and move one or more shutter elements to block the lens aperture and allow no light to enter the camera, and when current flows through said coil in a first direction said member will be attracted by the first magnetic field and move to a second location and move one or more shutter elements to form a first aperture size and if current flows through said coil in a second direction said member will be attracted by the first magnetic field and move to a third location and move one or more shutter elements to form a second aperture size.

2. The device claimed in claim 1 wherein said movable magnetic member comprises:
    an arm; and
    a permanent magnet that is attached to one of the ends of said arm.

3. The device claimed in claim 1 wherein said setting means comprises:
    means for sensing the amount of light that is available to take a picture, said sensing means is coupleable with a source of current;
    means coupled to the output of said sensing means and said coil for determining whether current will flow in said coil in a first direction or in a second direction; and
    means coupled to said current means and said determining means for allowing said determining means to select a first or second direction.

4. The device claimed in claim 3 wherein said sensing means is a photocell that senses light.

5. The device claimed in claim 3 wherein said allowing means comprises:
    a switch coupled to said current means; and
    a properly biased one shot that is coupled to said switch, said current means and a strobing input of said determining means so that said determining means will only select a first or second direction when said switch is closed.

6. The device claimed in claim 3 wherein said allowing means is a switch.

7. The device claimed in claim 3 wherein said sensing means is a sensor that has a first output for a specified amount of light that is available to take a picture and a second output if a different amount of light is available to take a picture.

8. The device claimed in claim 7 wherein said determining means comprises:
    means coupled to the output of said sensor for responding to the amount of light that is present, said responding means has a first transmission output if said sensor has a first output and said sensor has a second transmission output if said sensor has a second output;
    first logic means for transmitting said first transmission signals, said first logic means is coupled to said first and second transmission signals;
    second logic means for transmitting said second transmission signal, said second logic means is coupled to said first and second transmission signals;
    third logic means for sending current to said coil in a first direction, said third logic means is coupled to said first logic means, said coil and said current means; and
    fourth logic means for sending current to said coil in a second direction, said fourth logic means is coupled to said second logic means, said coil, and said current means.

9. The device claimed in claim 8 wherein said responding means is a properly biased transistor.

10. The device claimed in claim 8 wherein said first logic means is a NOR gate.

11. The device claimed in claim 8 wherein said second logic means comprises:
    a NOR gate; and
    an inverter whose input is coupled to the output of said NOR gate and whose output is coupled to said fourth logic means.

12. The device claimed in claim 8 wherein said third logic means comprises:
    a first properly biased transistor that is coupled to said first logic means, said current means and one end of said coil; and
    a second properly biased transistor that is coupled to said first logic means, said current means and the other end of said coil.

13. The device claimed in claim 11 wherein said fourth logic means comprises:
- a first properly biased transistor that is coupled to said second logic means, said current means and one end of said coil; and
- a second properly biased transistor that is coupled to said first logic means, said current means and the other end of said coil.

14. An electromagnetic actuation method of controlling the movement of a movable member that moves one or more shutter elements that control the amount of light that passes through a camera aperture which comprises the steps of:
1) establishing a first magnetic field having a north and south pole;
2) establishing a second magnetic field at one of the ends of the movable member;
3) coupling the first magnetic field to the second magnetic field;
4) controlling the polarity and presence or absence of the first magnetic field so that if there is no first magnetic field, the movable member will pivot to a first location in said first magnetic field, and if said first magnetic field has a first polarity the movable member will pivot towards a second location in the first magnetic field and if said first magnetic field has a second polarity the movable member will pivot towards a third location in the first magnetic field,
whereby when the member is at the first location one or more shutter elements block the aperture and when the member is at the second location the one or more shutter elements will form a first aperture opening and when the member is at the third location the one or more shutter elements will form a second aperture opening.

15. The method as recited in claim 14, wherein the first step includes:
supplying current to a coil of an armature to establish a first magnetic field.

16. The method as recited in claim 14, wherein the second step includes:
affixing a permanent magnet to one of the ends of the member.

17. The method as recited in claim 14, wherein the third step includes:
positioning the magnetic end of the member in the first magnetic field.

18. The method as recited in claim 14, wherein the fourth step includes doing one of the following steps:
1) transmitting no current to the coil;
2) transmitting a current having a first polarity to the coil; or
3) transmitting a current having a second polarity to the coil.

19. An electromagnetic shutter actuating mechanism comprising:
- shutter means movable from a closed position to first and second open positions for forming respective different size openings;
- an electrically conductive core having a pair of spaced opposite ends;
- coil means wound on said core between its opposite end for receiving an electric current alternatively in opposite directions to produce a magnetic field between said opposite ends which has different orientations corresponding to the direction of the current received at said coil means; and
- actuator means having a normal position between said opposite ends of the core, when an electric current is not received at said coil means, for maintaining said shutter means in its closed position and magnetically attracted to either one of said opposite ends in accordance with the orientation of a magnetic field produced between the opposite ends, when an electric current is received at said coil means alternatively in opposite directions, for moving the shutter means to its first and second open positions.

* * * * *